UNITED STATES PATENT OFFICE.

JACOB KUHN AND ALFRED PEW, OF GRAND RAPIDS, MICHIGAN.

IMPROVEMENT IN PROCESSES OF IMITATING FRENCH WALNUT VENEERING.

Specification forming part of Letters Patent No. 173,302, dated February 8, 1876; application filed November 24, 1875.

*To all whom it may concern:*

Be it known that we, JACOB KUHN and ALFRED PEW, of Grand Rapids, in the county of Kent and in the State of Michigan, have invented certain new and useful Improvements in Imitating Caucasian or French Walnut Veneering; and do hereby declare that the following is a full, clear, and exact description thereof.

The nature of our invention consists in an improved process for imitating French walnut veneer, the object of which is to save the cost of such veneer, and to make the imitation durable, as will be hereinafter more fully set forth.

In the first place, we prepare the wood by using a filling composed of corn-starch or silver-white mixed with boiled linseed-oil, japan, turpentine, or naphtha. We completely cover the surface with this mixture, letting it remain on about fifteen minutes, or until it becomes like paste, and then rub it off with a rag. This fills the pores of the wood, and makes a good smooth surface, which is left to dry for twelve hours, after which it is covered with a coat of paint, which is prepared of the following colors—viz., white lead, English orange mineral, French ocher, American vermilion, or Tuscan red, mixed with boiled oil, japan, and varnish. When this is dry we use a preparation for graining composed of the following colors, mixed well together with boiled oil, japan, and turpentine: first, French ocher, English orange mineral, burnt umber, and American vermilion; second, American vermilion, burnt umber, and ivory-black; third, burnt umber, and ivory-black; fourth, ivory-black. The first is spread over the entire surface with any kind of soft brush. The second and third are put on in spots or streaks, as desired. These colors all being on the surface at once, a rag or sponge is used to absorb the surplus color, and at the same time mix them together, after which a blender is used to smooth down the colors preparatory to the next process, which is called overgraining, and for which the fourth preparation is applied with a soft, flowing brush.

To form the figures desired a small camel's-hair pencil is used to make heavy lines, and to give shade to the figures already made. It is then left to dry for a few hours, when the process of shading is done. This is made of burnt umber ground in water. It is put on the whole surface with any kind of a brush, after which it is wiped off with a wet sponge, streaks being left where desired. It is then blended to smooth the shading left in the streaks. In about two hours it is ready to varnish, and when dry is ready for use.

Having thus fully described our invention, what we claim as new, and desire to secure by Letters Patent, is—

The process for imitating French walnut veneering, consisting, essentially, first, of preparing the wood with a filling composed of corn-starch or silver-white mixed with linseed-oil and japan, turpentine, or naphtha; then rubbing the same with a cloth; then coating it with a paint composed of white lead, English orange mineral, French ocher, and American vermilion or Tuscan red, mixed with boiled oil, japan, and varnish; then applying a graining of colors, consisting of French ocher, English orange mineral, burnt umber, American vermilion, and ivory-black, mixed with boiled oil, japan, and turpentine; then using a rag or sponge to remove portions of the color; then using a blender, and, finally, overgraining the surface, all substantially as herein set forth.

In testimony that we claim the foregoing we have hereunto set our hand this 8th day of November, 1875.

JACOB KUHN.
ALFRED PEW.

Witnesses:
CHAS. C. HOWELL,
GEORG FARNSWORTH.